July 26, 1949.  T. D. HEATH  2,477,454
PROCESS OF REDUCING FERRIC OXIDE
TO FERROSOFERRIC OXIDE
Filed Sept. 15, 1944
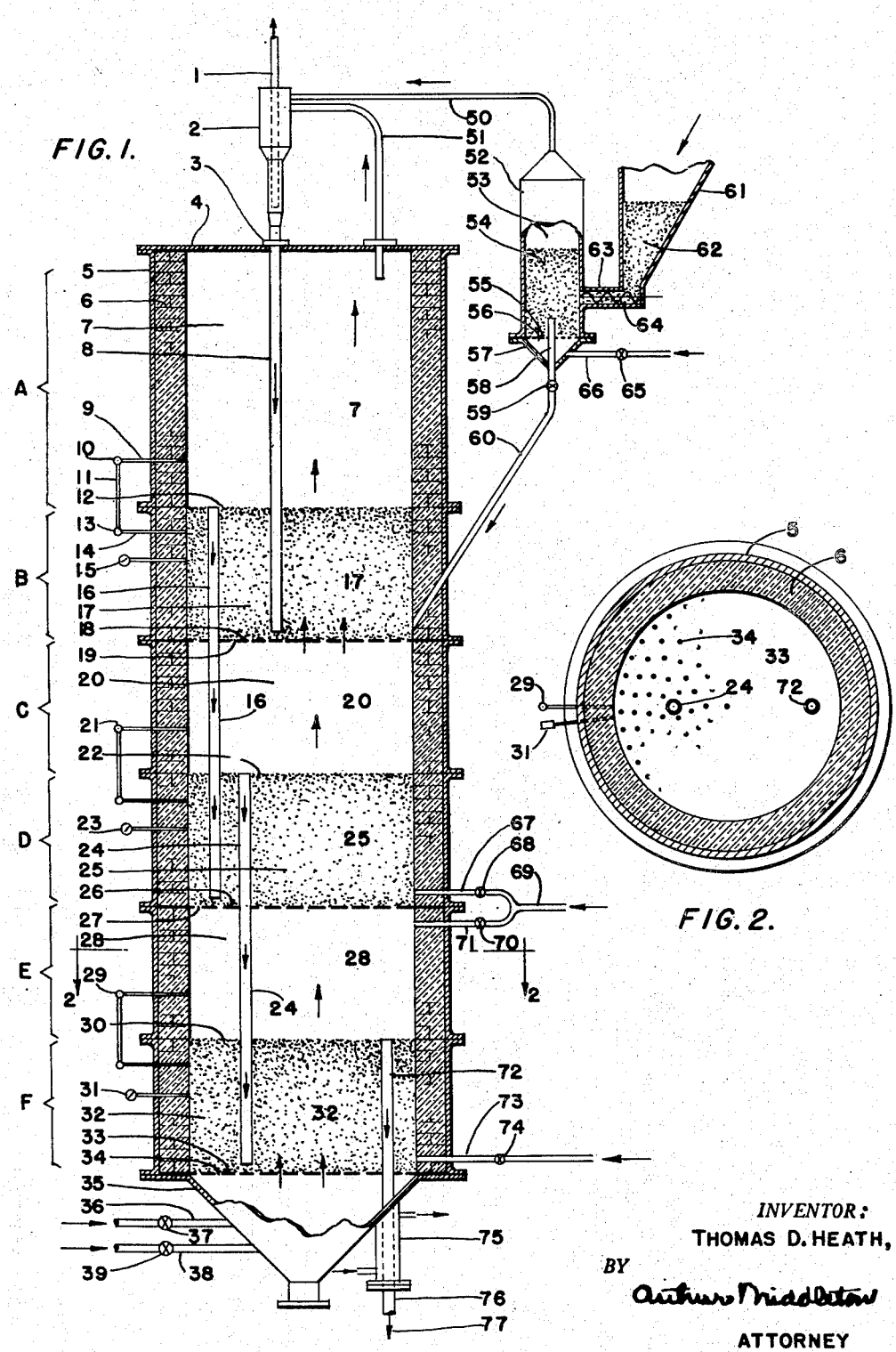
INVENTOR:
THOMAS D. HEATH,
BY
Arthur Middleton
ATTORNEY Patented July 26, 1949

2,477,454

UNITED STATES PATENT OFFICE 2,477,454

PROCESS OF REDUCING FERRIC OXIDE TO FERROSOFERRIC OXIDE

Thomas D. Heath, Westport, Conn., assignor to The Dorr Company, New York, N. Y., a corporation of Delaware Application September 15, 1944, Serial No. 554,201

3 Claims. (Cl. 23—200)

This invention relates to the reduction of iron ore whereby certain of its iron-bearing constituents and especially its ferric oxide constituents are reduced or converted to magnetite, and more particularly by the use of the treatment of the ore particles while in suspension or teeter in an upflowing stream of heating and reducing gas. Such a suspension of ore particles in teeter is effected in a reactor chamber, preferably vertically disposed, having an orificed plate, known as a constriction plate, through the orifices of which gas is passed. The size and disposition of the orifices, and the velocity of the gas passing through the orifices are so correlated that all particles above the plate are kept in suspension and mobilized. That is, they are kept in turbulent motion and in ever-changing state to such an extent that substantially none come to rest on the upper face of the plate. Under such conditions the suspended solids act like a fluid. As the solids are separated from each other and have a discernible range of action, the depth of a bed of such suspended, teetered, or fluidized solids is considerably deeper than the same bed of solids when at rest.

If the orifices and the velocity of the gas passed therethrough are not properly correlated, disadvantageous results are experienced, namely, if the velocity is too low, the bed of solids is dead, that is, not mobilized or fluidized. If the velocity is too high, some of the solids are blown out of the reactor chamber with the result that there is too high a dust loss. The latter is important and to cut down the otherwise inevitable dust loss, the height of the reactor chamber is selected to have a substantial freeboard or extent above the top of the bed of solids when fluidized or in teeter.

In accordance with certain phases of the present invention, the ore to be reduced is first converted into a granular or powder form and the resulting powder or granules are thereafter fed into a reaction chamber through which the treatment gas passes upwardly at a velocity controlled with respect to the density and size of the ore particles so that the particles within the chamber are maintained in a dense, turbulent state without permanently entraining the ore particles or granules in the gas stream.

By properly regulating the velocity of the gases rising upwardly through a reaction chamber, the ore particles are suspended and made to assume the character of a boiling liquid and to possess fluid properties capable of seeking their own level and otherwise conforming to hydrostatic principles. For example, it has been found satisfactory that when passing a stream of gases upwardly through a mass of subdivided ore solids having particle sizes ranging up to minus 14 mesh screen (Tyler) in diameter at extremely low velocities, such as of the order of a fraction of a foot per second, the mass of solid material remains stagnant and the gases percolate through the resulting mass. By gradually increasing the velocities of the gases, a point is reached wherein a portion of the finer particles separates into an upper layer which is maintained in a turbulent condition by the upward passage of the gases therethrough, whereas the bottom portion of the mass continues to remain stagnant. As the velocity continues to increase, a greater portion of the solids is carried into the upper turbulent layer until the velocity has reached a point so that the entire layer becomes turbulent.

The gas velocities are controlled with respect to the density and size of the ore particles to maintain the mass in a dense, fluid, turbulent condition. This turbulent condition prevents channeling of the reducing gas through the mass and also avoids or prevents any tendency of the particles or granules to coalesce or agglomerate into larger masses at the relatively high temperatures employed in the reducing reaction. Furthermore, the turbulent condition of the solids undergoing reduction tends to maintain an extremely uniform temperature condition throughout the entire mass, thus avoiding any localized overheating which might otherwise tend toward inefficient reduction.

The process forming the present invention may be operated either continuously wherein a stream of such ore in granular or powder form is continuously passed into the reaction or reactor chamber and the reduced material continuously withdrawn therefrom, or it may be operated in a discontinuous manner in which batches of ore are successively treated, as hereinafter described.

When operating the process continuously the ore is preferably passed through a plurality of independent zones, of which at least one is a combustion zone, in which the ore is heated to the reduction temperature or above and is thereafter reduced in one or more subsequent zones. Following reduction of the ore, the treated material may then be passed through a cooling zone.

More particularly when operating the process continuously the ore is preferably passed into and through a reaction furnace or chamber having a plurality of independent zones vertically spaced one above the other of which at least an upper one is a combustion (oxidation) zone wherein there is effected a heating of the ore to and above reduction temperature, to wit, to and somewhat above 500° C., but not substantially more than 1000° C. and of which the next lower one is a reducing zone wherein substantially no oxidizing of the ore particles therein takes place, but on the contrary, wherein a reducing of the oxygen-content of the ferric oxide constituents of the ore takes place but not sufficiently whereby free or uncombined iron oxide (FeO) or metallic iron (Fe) is yielded. Following such reduction of the ore that changes ferric oxide naturally therein to magnetite, the treated material is discharged from the reactor chamber whereupon the magnetite can be separated from the gangue constituents of the ore. Simultaneously with said reduction, the residual gases having potential heat or burnable components pass directly into and upwardly within the combustion zone where oxygen-bearing gases are mingled therewith to produce combustion and consequent heating of the ore particles of the fluidized ore bed within the combustion zone.

Therefore, this invention proposes to have a multi-compartment reactor wherein an upper mobilized bed of ore particles is heated by combustion, from which the hot ore drops to a reduction chamber or zone therebelow which is maintained under reducing conditions. From the combustion chamber above the reducing chamber, the fluidized heated ore particles are caused to overflow automatically and continually through a downflow or dip-pipe into the reducing chamber therebelow, and the influent end of the downflow pipe is used to determine the effective "fluid" level above which suspended solids in the fluid bed cannot go. There is thus effected counter-current treatment of downflowing solids by upflowing gases.

Another feature of the invention is the use of the same kind of "fluid" level control of the bed in the reduction treatment which is the function of the downflow pipe through which reduced material is removed from the reducing chamber.

An important feature of this invention is the maintenance of two superposed chambers or zones, of which an upper one is a combustion zone wherein combustion takes place to produce heat whereby the temperature of the ore can be controlled, and of which a lower zone is a reduction zone wherein little or no combustion takes place.

More particularly a basic feature of this invention revolves about the maintenance in vertically-positioned vertically-spaced zones within a reaction furnace or chamber of which an upper zone has combustion maintained therein and a lower has ore-reduction conditions maintained therein. In each of said zones there is maintained a bed of ore particles maintained fluidized due to the velocity of the gas uprising therethrough. In the combustion zone, heat of combustion is relied upon to secure heating the ore particles of the bed to temperatures somewhat higher than that required whereby ferric oxide can be reduced in the presence of a reducing atmosphere to magnetite. From the combustion zone, the heated ore particles are transferred to and delivered into the lower portion of that fluidized bed lying within the subjacent reduction zone into which is delivered a gaseous medium at ore-fluidizing velocity which has reducing and potential heat characteristics or constituents. The gas is of such composition that its reducing power is sufficient to reduce ferric oxide of the ore into magnetite ($Fe_3O_4$) but insufficient to effect reduction of ferric oxide of the ore to free or uncombined ferrous oxide or iron. From the upper portion of the reduction bed, the ore particles thereof whose ferric oxide has been thus reduced, overflow and are delivered preferably to a cooling zone and then to a locality outside of said chamber or furnace. After leaving the reducing bed, the residual gases with their potential heat-producing components, pass upwardly into and through the bed of fluidized ore within the superjacent combustion zone to which residual gases are added and mixed with an oxygen-bearing gas from a source outside the reactor or furnace. Resulting combustion assures sufficient heat in the combustion zone for raising the temperature of the ore particles in the combustion bed to temperatures within a range upward from 500° C. to substantially not above 1000° C. Products of such combustion rise and pass from the furnace or chamber.

A further and very important feature of this invention resides in the manner in which control is exercised so that ferric oxide constituents of the iron ore are reduced to magnetite. Thus, the fundamental feature of the invention revolves about the reducing operation on the ore as carried out in the lower or reducing zone wherein there is substantially no combustion, to wit, within the ever-changing body of ore particles having enough residual heat as a result of having been previously heated in the superjacent combustion zone at least to somewhere above 500° C. but not substantially above 1000° C. Within the fluidized bed in the lower or reduction zone, the ore particles are continued as material already heated up to a temperature at least sufficiently high whereby the sought-for reduction takes place, while there is supplied to said ore in the bed in the reduction zone, a gas having reducing constituents sufficient to reduce ferric oxide constituents of the ore to $Fe_3O_4$ but insufficient to reduce those constituents so as to produce uncombined FeO or Fe. The preferred reducing constituent is either or both of hydrogen and carbon monoxide. Therefore, the chemical reaction desired is—

$$3Fe_2O_3 + CO \rightleftharpoons 2Fe_3O_4 + CO_2$$

and/or $$3Fe_2O_3 + H_2 \rightleftharpoons 2Fe_3O_4 + H_2O$$

and the reactions to be avoided or minimized are:

$$Fe_3O_4 + H_2 \rightarrow 3FeO + 4H_2O$$
$$Fe_3O_4 + CO \rightarrow 3FeO + 4CO_2$$
$$FeO + H_2 \rightarrow Fe + H_2O$$
$$FeO + CO \rightarrow Fe + CO_2$$

so the manner in which this control is exercised is a major factor in the successful practice of this invention.

At the same time this control of quantity of reducing constituents added is exercised, it must be recalled that the total volume of supplied gas must be continued to meet the requirement of maintaining the ore fluidized or in teeter. This total volume must be enough to keep the solids fluidized and the criterion of the volume I have adopted is a space rate velocity. Space rate is used because it is important to measure the velocity of the gas through a space substantially free of suspended solids. The reason for this is that the velocity through suspended solids is not absolute, for it will vary in proportion as solids are present. Therefore, I prefer to measure the velocity of the gas through the atmosphere or freeboard space above the fluidized bed.

All of the foregoing comprise manifestations and attainments of objects of this invention.

The best embodiment of the invention known to me is illustrated in the accompanying drawings which should be taken as informative rather than limitative for the invention obviously may be carried out in modified instrumentalities. In the accompanying drawings, Fig. 1 shows a vertical sectional view, while Fig. 2 is a transverse horizontal view taken along the line 2—2 in Fig. 1 when the reactor is empty.

In the drawings, the total assembly, called a reactor, is preferably a vertical cylinder made up of sections, such as A, B, C, D, E, F, etc. suitably secured together, each having a metal outer wall 5, lined with insulation and firebrick 6. The reactor has a top 4, and a coned bottom 35 provided with a valved outlet. Section B is provided with a constriction plate 18 having a plurality of orifices 19. The plate extends across the reactor throughout its cross sectional area and is adapted to hold thereon a bed 17 of fluidized ore being heated by heat transfer, above which is a freeboard space 7. Section D has a similar constriction plate 26, with orifices 27, and adapted to hold a bed 25 of fluidized ore being treated, above which is a freeboard space 20. Section F has a further constriction plate 33 with orifices 34, adapted to hold a bed 32 of fluidized ore being reduced, above which is a freeboard space 28.

The top fluidized bed 17 has its "fluid" level 12 controlled by the entrance to a conduit or dip-pipe 16, down which ore drops into the next lower bed 25, since the outlet end of the dip-pipe 16 terminates slightly above the constriction plate 26.

Similarly, the top of the fluidized middle bed 25 has its fluid level 22 controlled by the entrance to a conduit or dip-pipe 24, down which ore drops into the bottom bed 32, since the outlet of the dip-pipe 24 terminates adjacent the constriction plate 33. The fluid level 30 of the bottom bed 32 is likewise controlled through the medium of conduit or dip-pipe 72 down which ore passes to discharge at 77 through pipe 76 which has associated with it a cooling device 75 which might possibly be a heat-exchanger. Dust rising from the top bed 17 tends to pass upward through pipe 51 leading upwardly through a sealed closure in the top 4 of the reactor to a cyclone 2 having an exhaust pipe 1. Solids separated by the cyclone 2 drop back into the reactor by down-pipe 8 extending through seal 3 in the top 4 of the reactor as shown.

Gas is supplied to the reactor through an inlet pipe 36 at the bottom thereof, suitably valved as at 37. The volume of supplied gas is sufficient to fluidize the ore particles in all of the beds thereabove. Exhaust gas passes upwardly through pipe 51 to the cyclone, and dust collected by the cyclone is returned to the top bed 17 through the return pipe 8.

Ore 62 to be treated in reactor is supplied to the hopper 61 whose bottom is laterally extended at 63 to house a screw or other conveyor 64 for impelling the ore into the feed fluidizing tank or chamber 52. This chamber is adapted to hold a bed 54 of fluidized feed ore supported on a constriction plate 55, having orifices 56. The plate 55 is located in the chamber just above its tapered or coned bottom 57. Above the fluidized bed of feed ore is provided a freeboard space 53, and the top of the chamber 52 has a pipe 50 leading to the cyclone for conveying thereto any dust rising in the freeboard space 53. Fluidizing gas for the bed 54 is supplied to the coned bottom 57 of the tank, and beneath the constriction plate 55, through a pipe 66, suitably valved as at 65. An ore discharge pipe 60 terminates in the bed 54 at some height intermediate of the bed, and conducts fluidized feed ore to the top bed 17 of the reactor near the bottom of that bed. This pipe 60 is suitably valved as at 59.

In order to supply air, when needed, to the intermediate bed 25 in section D for maintaining that bed as a combustion or oxidation zone, there is provided an air supply pipe 69 connected with a manifold, the ends of which are connected respectively with a pipe 67 leading through the reactor wall into the bed 25, and a pipe 71 leading through the reactor wall to the freeboard space 28 in section E. Pipe 67 is suitably valved as at 68, and pipe 71 is suitably valved as at 70—or possibly there could be only one valve on the air supply pipe 69.

A pipe 73, suitably valved as at 74 and provided with a burner, is supplied for the bottom bed 32 in section F, to supply fuel for starting up. The latter bed comprises a reduction zone.

The numeral 15 represents a thermometer or other heat measuring instrument to indicate the temperature of the bed 17. Similar instruments are represented by the numerals 23 and 31 in beds 25 and 32 respectively.

10, 11, 13 and 14 represent pressure-comparing instruments associated with bed 17 and freeboard space 7, for measuring the pressure in bed 17 as compared with the pressure in freeboard 7. If the bed 17 showed the same pressure as the freeboard space 7, it would show that the bed was dead and not fluidized. So the pressures are compared to indicate the extent to which the bed 17 is fluidized as well as the depth of the bed. Similar instruments are provided for the beds 25 and 32 which are shown but indicated generally by the reference numerals 21 and 29 respectively.

*Operation*

Assuming that the reactor is in full and continuous operation, the middle bed 25 is the hottest and is the place where oxidation and combustion take place, due to the introduction of air thereinto through the pipe 69. Here the temperature is controlled so that the ore of this bed is maintained hotter than 500° C. and preferably of the order of 750° C. but not higher usually than 1000° C. The reason is that the ore must be so hot that after it falls down the dip-pipe 24 into the bottom bed 32, the temperature in that bed is maintained at not substantially less than 500° C. Bed 32 is where ferric oxide constitutents of the ore are reduced to magnetite, and it is to be noted that in the practice of this invention, reduction takes place in one place (bed 32) while combustion and oxidation take place in another place (bed 25). Thus, these two steps are kept separate. Ore in the top bed 17 gets a preliminary heating due to heat rising from the middle bed 25, so the ore in bed 17 is preheated by sensible heat, before it drops through dip-pipe 16 into the middle bed 25 where the ore is subjected to latent heat predominantly, since heat is generated in that combustion zone. In the bottom bed 32, no heat is generated, although the over-all heat balance therein is endothermic due to chemical reduction that takes place in that bed.

With these conditions obtaining, the ore fed to the top bed is preheated by hot gases rising from the middle bed 25 wherein the preheated ore is to be heated by combustion to approximately 750° C. And then oxidized ore at substantially that temperature falls to the bottom bed where it is maintained at a temperature above that at which reduction takes place. Treated ore wherein hematite or other $Fe_2O_3$ constituent has been reduced to magnetite finally passes from the reactor through the dip-pipe 72, and discharge pipe 77, during progress through which the ore is cooled for minimizing reversion of the magnetite. The magnetite is then separable from the residue by known methods. Factors of substances input to the reactor must be so correlated that substantially no reduction takes place in the middle bed 25 for it is important that substantially no reduction takes place therein, and particularly that the production of uncombined FeO or Fe be carefully minimized.

For this reason, reduction of ferric oxide to magnetite in the bottom bed 32 (reduction zone) is effected by feeding reducing gas through the pipe 36 and into the coned bottom 35 of the reactor, from whence it rises through the orificed constriction plate 33 that supports bed 32. The gas is supplied in such volume and at such velocity that the ore in bed 32 is maintained mobilized and fluidized, namely, turbulent and in full teeter, so that the ore particles are in suspension in the rising gas and act like a fluid. As the ore particles rise above the level 30 of the dip-pipe 72 they flow into and down that pipe, so that a "fluid" level is maintained in the bed 32 at substantially the elevation of the influent end of that pipe. As the fluidized ore particles rise, an expansion space or freeboard 28 is provided above the bed for minimizing inadvertent passage of suspended particles upward into the middle bed 25. This freeboard space has been found to operate satisfactorily if it is about as high as the bed is deep, and in practice both of these have been made five feet in depth.

The gas supplied through the pipe 36 should be such that its passage through the bed 32 should be at a "space rate" velocity of between 0.50 to 1.50 feet per second depending upon the particle size and density of the material being treated. Space rate is the velocity of the gas through space, namely, through the fluidized bed ignoring the volume occupied in the solids, or through the freeboard space 28 overlying the bed. At a velocity less than substantially 0.50 the ore solids are not well mobilized or in teeter, and at a velocity greater than 1.50, dust loss is excessive. The characteristics of the reducing gas are important as previously described in this specification, namely, in general there must not be enough hydrogen to yield an appreciable amount of water with oxygen from the ore and there must not be enough carbon monoxide to yield an appreciable amount of carbon dioxide with oxygen from the ore.

In the gas burning or gas-combustion zone (bed 25) the depth of bed 25 and freeboard space 20, correspond to those in the bottom section, namely five feet each. If the gas rising through the constriction plate 26 of bed 25 is not sufficient to fluidize the ore particles of that bed, this can be boosted by air inlet through pipe 71 beneath that constriction plate, for the solids of bed 25 must be maintained fluidized or in teeter the same as in bottom bed 32. Sufficient air must be supplied to the bed 25 to promote burning and oxidation, so air for this purpose can not only be supplied through pipe 71 beneath the constriction plate, but also through pipe 67 above that plate.

In bed 25, the solids are fluidized and rise into the freeboard space 20, from whence they flow down dip-pipe 24 into the reduction bed 32, and the level of this bed 25 is thus automatically maintained at substantially the elevation of the influent upper end of the pipe 24. Gas rising from bed 25 passes through constriction plate 18 of the upper preheating bed 17 at sufficient velocity to maintain the solids of that bed also in fluidized condition. This is preferably likewise five feet in depth, but the freeboard space 7 thereabove is usually ten feet in depth for minimizing dust losses. Thus the freeboard space may be a height equal to from one-half to two times the depth of the fluidized bed. Fluidized solids from this bed flow down dip-pipe 16 to the bed 25 below, in a preheated condition due to transfer of heat thereto by the rising gases. Neither oxidation nor reduction takes place in this bed. Gases and dust entrained therein exhaust upwardly through pipe 51 to the cyclone 2, wherein dust is caught and returned to bed 17 through pipe 8, while the gases exhaust through pipe 1 to waste, or for re-use, as the case may be. It is to be noticed that this apparatus makes use of the counter-current principle in that the ore progresses generally downwardly while the treating gas progresses upwardly. However, in each bed the ore is supplied to the bottom section thereof which means that each ore particle must rise from the place whereat it is supplied to the bed, to at least the elevation of the entrance of the dip-pipe or down pipe for conducting the ore to the next lower bed, or to discharge, as the case may be. To this extent, co-current operation is used. At any rate, this method of passage of the ore in a bed discourages by-passing or short circuiting of the ore before being properly treated within each bed. Also localized over- or under-heating is minimized.

Ore 62 is continually supplied to the reactor for treatment therein, preferably by being supplied to the hopper 61 from whence it is impelled by screw conveyor 63, or other suitable means, into feed tank 52 wherein there is maintained another bed 54 of fluidized ore supported from a constriction plate 55 having orifices 56. Fluidization takes place by means of air supplied through pipe 66 at sufficient velocity to fluidize the ore. Fluidized ore descends through dip-pipe 60 to pass as feed, into the preheated bed 17. Ore is supplied at a range of rates from 10 to 200 pounds per hour per square foot of cross-sectional area of the reactor.

The depth and temperature of the bottom or reduction bed 32, should be so adjusted that when about 95% to 100% of the ferric oxide is reduced to magnetite, the exit gases rising from this bed will contain the desired potential and sensible heat that will be required in beds 25 and 17. In this connection see page 511 of Haslam and Russell's book entitled Fuels and Their Combustion, copyrighted 1926 by the McGraw-Hill Book Company, Inc. where potential heat is defined as follows: "Potential or undeveloped heat is the heat available as unconsumed gas, such as carbon monoxide, hydrogen, methane, or soot." In other words, the reducing gas made use of also has components which, when they reach the combustion bed 32 are then for the first time mixed with air (from pipes 67 or 71), are then burned, and are thus heat-imparting.

In starting up, before any ore has been supplied to the reactor, oil is fed to pipe 73 and its burner provided for bottom bed 32 is lighted. Air is supplied to that bed through pipe 38 to permit combustion to take place. When the reactor is hot enough, ore is then fed thereto and the burner is turned off, as well as the air supply 38. Thereafter, all heat is provided in the bed 25.

The constriction plates are made of heat-resistant metal or other material and are sufficiently strong to support their burden of ore particles being treated, without substantial warping or distortion. The orifices in the constriction plates are sized and spaced so as to assure that substantially all ore particles of the bed supported by the plate are fluidized and that neither channeling takes place nor that some of the particles lie dead on the plate.

Whereas only three beds have been shown, of which the top one is a preheating chamber, the middle one is a burning or oxidizing chamber, and the bottom one is a reduction chamber, obviously any or all of these could be made multi-stage. That is, reduction could take place successively in two or more reduction chambers; oxidation could take place in two or more successive chambers; and preheating could take place in several superposed chambers, should such be desirable. Indeed, if economy is unimportant, the preheating chamber could be eliminated for the basic concept of this invention requires one chamber of a reactor where the heat required is produced, and another chamber of the reactor wherein the chemical reduction of the heated ore takes place. Initial starting up has been shown to be by the use of an oil burner, but obviously other means of initial heating of the reactor could be used. That is, the reducing gases may be formed from solid liquid or gaseous fuels, either inside or outside of the fluidized bed.

The practice of this invention results in the following advantages over other methods proposed:
(a) The reducing gas performs the function of reducing the ore before it loses any of its potential reducing power by being oxidized by air;
(b) no potential heat is lost from the reactor since, under good operating conditions, all the CO and $H_2$, i. e. the source of potential heat, is oxidized to $CO_2$ and $H_2O$ in the combustion chamber; (c) there is no possibility of an oxidizing zone existing in the reducing chamber, such as would result if both oxidation of part of the reducing gas for heating purposes and reduction of the ore were attempted in this one chamber. This lack of an oxidizing zone means less bed depth required for a given percentage of ore reduction in this compartment; and (d) the temperature in the burning or combustion compartment is sufficiently high to promote rapid and complete oxidation of CO and $H_2$ by air.

I claim:

1. The process of reducing ferric oxide constituents of iron ore to magnetite, which comprises maintaining in a chamber at least two superposed beds of ever-changing ore particles wherein in a lower bed combustion is minimized and reduction of ore constituents is carried out while in a superjacent bed combustion is carried out, passing a continuous stream of gas upwardly through the reduction bed and thence through the combustion bed at a velocity sufficient to maintain such particles in each bed in mobilized suspension with each bed presenting a fluid-level, supplying to the reduction bed a gas in volume and velocity for accomplishing said mobilized suspension while having constituents for potential heat and being of such composition that its reducing power is sufficient to reduce ferric oxide to magnetite but insufficient while uprising through the reduction bed to produce any substantial quantity of uncombined FeO and Fe, introducing from outside the chamber an oxygen-bearing gas to the residual gas uprising from the reduction bed with its potential heat soon enough thereafter to assure support of combustion available for heating particles in the combustion bed to more than 500° C. but not substantially more than 1000° C., feeding ore to the combustion bed whereby such ore becomes heated by said combustion to more than reduction temperature, conducting such heated ore while yet at least at reduction temperature from the fluid-level of the combustion bed to beneath the fluid-level of the reduction bed whereby while being mobilized and lifted by the uprising gas stream to the fluid-level of the reduction bed ferric oxide constituents of the yet heated ore are reduced to yield magnetite, and discharging magnetite-bearing ore from the reduction bed and from the chamber.

2. The process for reducing ferric oxide constituents of iron ore to magnetite, which comprises maintaining in a chamber three superposed beds of ore particles, passing gas upwardly through the lowest bed and thence through the beds above for maintaining the particles of each bed in a fluidized turbulent state whereby each bed presents a fluid-level, passing ore which has been so fluidized from one fluid bed to the next lower bed while out of contact with the main body of the gas uprising from the fluid level of the lower bed, feeding ore to the upper bed, said gas when entering the lowest bed being in quantity and having ore-fluidizing velocity as well as having constituents for potential heat and for reducing purposes and being of such composition that its reducing power is sufficient to reduce ferric oxide to magnetite but insufficient to produce any substantial quantity of uncombined FeO or Fe, heating the ore of the intermediate bed to a temperature of more than 500° C. by combustion of residual gases uprising thereinto from the lowest bed while combined with oxygen-bearing gas introduced into the combustion bed, heating ore in the upper bed by sensible heat rising from the intermediate bed, maintaining ore in the lowest bed at not substantially less than 500° C. while minimizing combustion therein, and removing treated ore from the latter having a magnetite content.

3. The process of reducing ferric oxide constituents of iron ore to magnetite, which comprises supplying ore to be treated to a reactor chamber divided into at least two superposed zones of which the upper zone thereof has combustion carried out therein to heat its ore to above reduction temperature and the lower zone thereof has reduction of the ore carried out therein, maintaining a bed of ore solids in each zone in fluidized and mobilized condition by gas passing upwardly through both beds, conducting ore particles heated above reduction temperature from the upper part of the upper bed to the lower part of the lower bed, and removing treated ore particles from the upper part of the lower bed, characterized in that reducing gas having potential heat characteristics is passed upwardly through the reduction bed in quantity and at a velocity for ore-fluidizing while being of such composition that its reducing power is sufficient to reduce the ferric oxide constituents of the heated ore in the reduction bed to magnetite but insufficient while uprising through the reduction bed at its ore-fluidizing velocity to reduce any significant quantity of ferric oxide to uncombined or free FeO or to Fe, and supplementing the residual gas rising from the reduction step in the reduction bed into and through the combustion bed with sufficient oxygen-bearing gas so that combustion is maintained substantially solely in the combustion bed to heat the fluidized ore therein to a temperature range of from 500° C. to 1000° C. so that when it is conducted to the reduction bed it is yet hot enough to be above reduction temperature when it encounters the reducing gas therein.

THOMAS D. HEATH.

REFERENCES CITED

The following references are of record in the file of this patent:

UNITED STATES PATENTS

| Number | Name | Date |
| --- | --- | --- |
| Re. 21,526 | Odell | Aug. 6, 1940 |
| 607,875 | Peak | July 26, 1898 |
| 1,987,278 | Wilson | Jan. 8, 1935 |
| 2,217,235 | Rieser | Oct. 8, 1940 |
| 2,270,903 | Rudbach | Jan. 27, 1942 |
| 2,296,522 | Hartley | Sept. 22, 1942 |
| 2,304,128 | Thomas | Dec. 8, 1942 |
| 2,316,664 | Brassert et al. | Apr. 13, 1943 |
| 2,358,039 | Thomas et al. | Sept. 12, 1944 |
| 2,367,694 | Snuggs | Jan. 23, 1945 |
| 2,371,619 | Hartley | Mar. 20, 1945 |

OTHER REFERENCES

Wetherill: "Rate of reduction of iron ores with CO," Industrial and Engineering Chemistry, vol. 26, No. 9, pages 983–985.